United States Patent [19]

Cheng et al.

[11] 4,218,893
[45] Aug. 26, 1980

[54] DISTILLATIVE FREEZING PROCESS FOR SEPARATING VOLATILE MIXTURES AND APPARATUSES FOR USE THEREIN

[76] Inventors: Chen-yen Cheng, 9605 La Playa St., NE., Albuquerque, N. Mex. 87111; Sing-Wang Cheng, 4th Floor, #1, Lane 479, Fu-Hsing N. Rd., Taipei, Taiwan

[21] Appl. No.: 930,312

[22] Filed: Aug. 2, 1978

Related U.S. Application Data

[63] Continuation-in-part of Ser. No. 816,852, Jul. 18, 1977, abandoned, and a continuation-in-part of Ser. No. 676,640, Apr. 13, 1976, Pat. No. 4,028,445.

[51] Int. Cl.² ............................................. B01D 9/04
[52] U.S. Cl. ........................................ 62/537; 62/532
[58] Field of Search ..................... 62/534, 539, 12–15, 62/532

[56] References Cited

U.S. PATENT DOCUMENTS

| | | | |
|---|---|---|---|
| 2,738,658 | 3/1920 | Bronson | 62/12 |
| 2,777,299 | 1/1957 | Skaperdas | 62/15 |
| 3,193,395 | 7/1965 | Tabler et al. | 62/537 |
| 3,298,796 | 1/1967 | Van Damme-VanWheele et al. | 62/537 |
| 3,690,116 | 9/1972 | Cheng et al. | 62/537 |
| 3,859,069 | 1/1975 | Seliber | 62/537 |

Primary Examiner—Norman Yudkoff

[57] ABSTRACT

The distillative freezing process disclosed is useful in separating a mixture containing at least two volatile components, denoted respectively as A-component and B-component, by simultaneously vaporizing the two components from the mixture under a sufficiently reduced pressure to simultaneously crystallize B-component. The vapor mixture obtained is brought to a condensed state either by a simple condensation operation or a condensation-desublimation operation without being substantially pressurized. The process may be conducted to completely eliminate the liquid phase and bring the mixture into the two phase solid-vapor region. Then, the solid phase in no longer contaminated by the adhering liquid phase and gives a high purity B-component on melting. The process is particularly useful in separating mixtures containing close boiling components, such as styrene-ethyl benzene mixtures, p-xylene-m-xylene mixtures and ethylene-ethane mixtures. The process can therefore be used in producing high purity monomers for the plastic industries and high purity chemicals for other industries.

15 Claims, 18 Drawing Figures

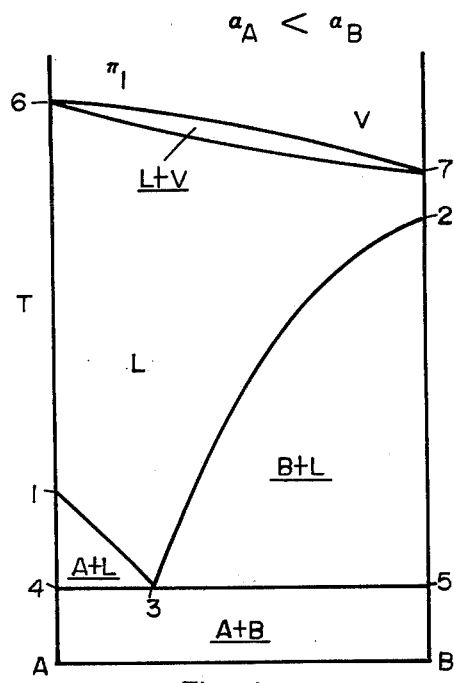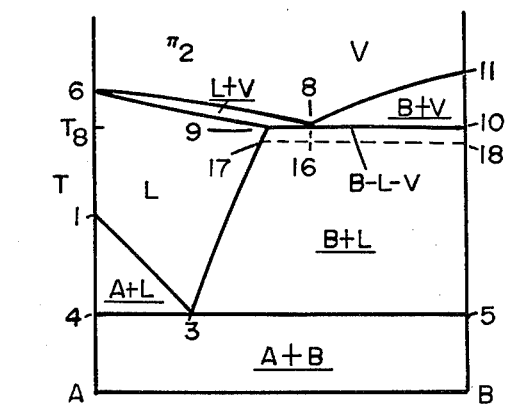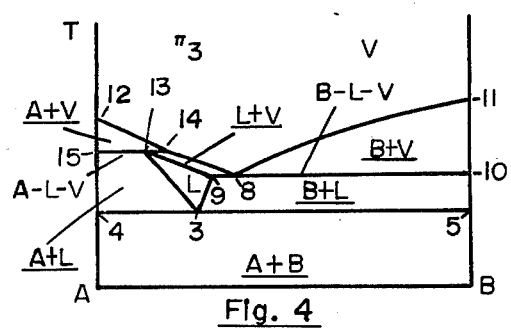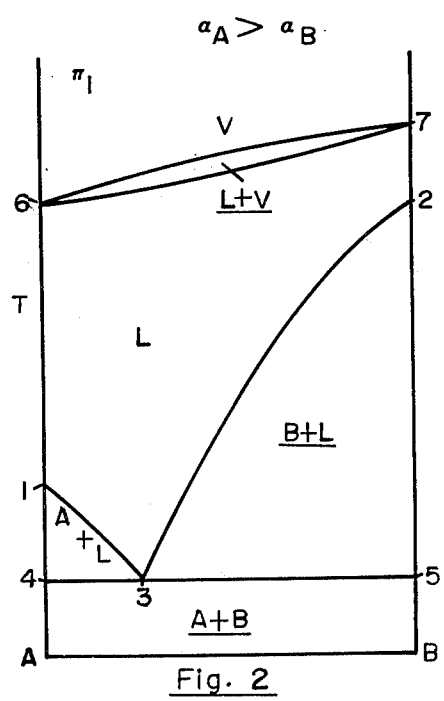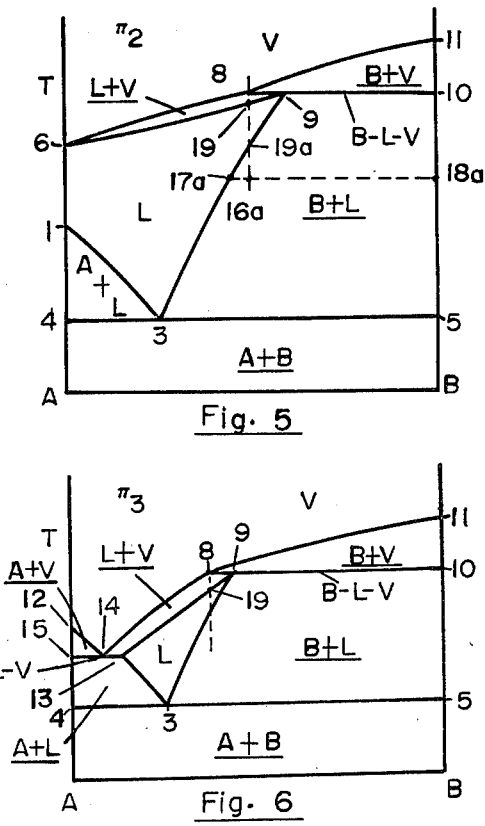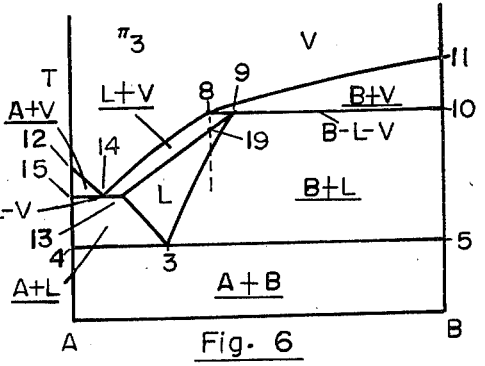

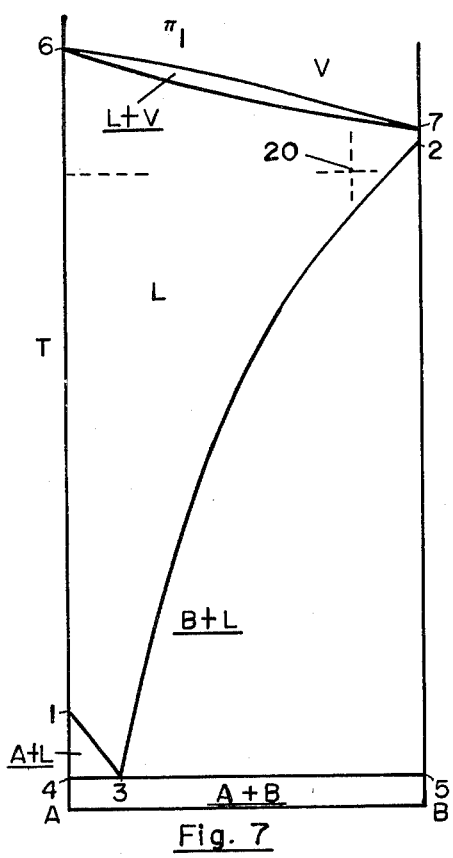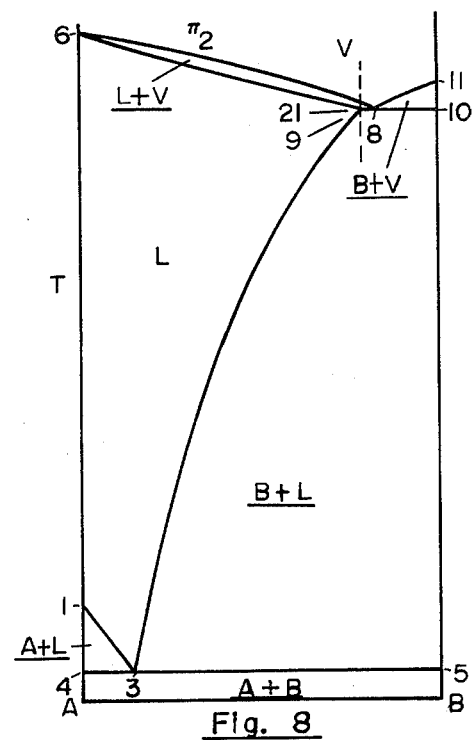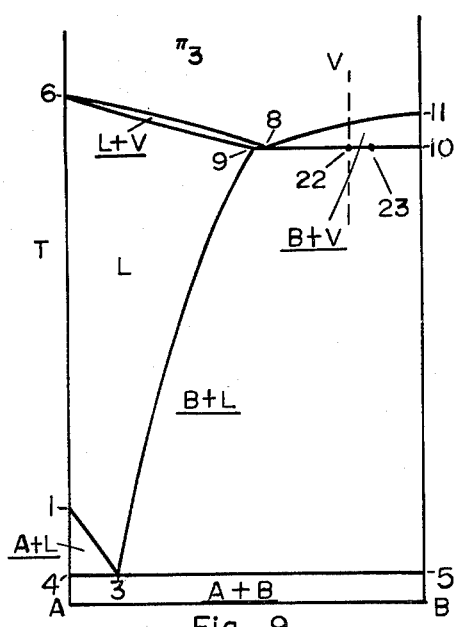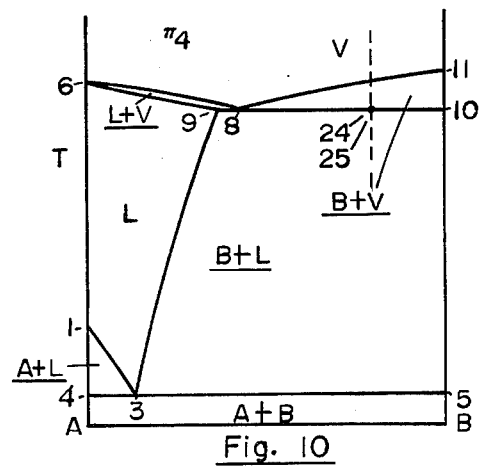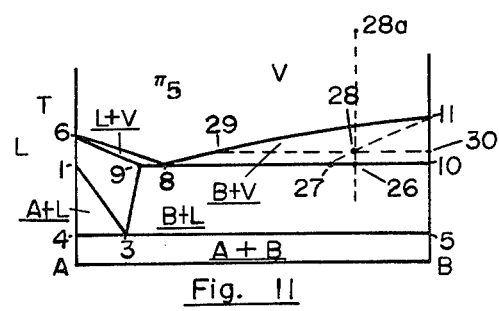
Fig. 7
Fig. 8
Fig. 9
Fig. 10
Fig. 11
DRAWING 2

DRAWING 3

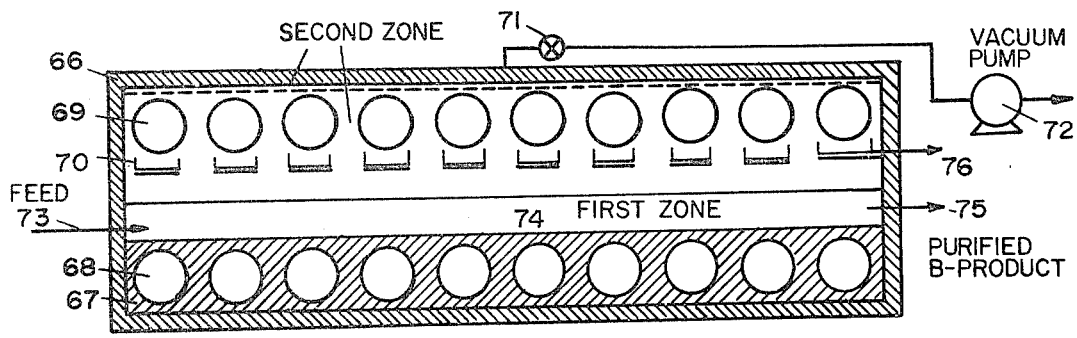
Fig. 15
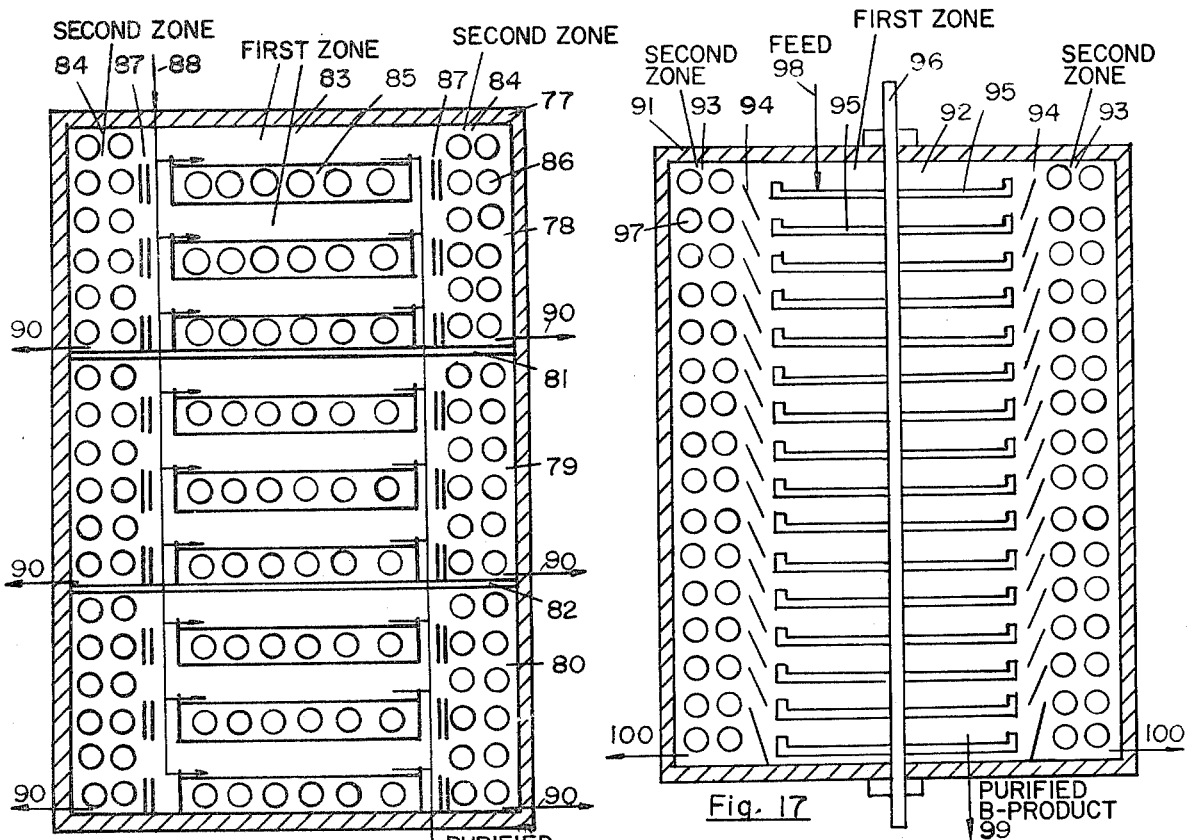
Fig. 16
Fig. 17
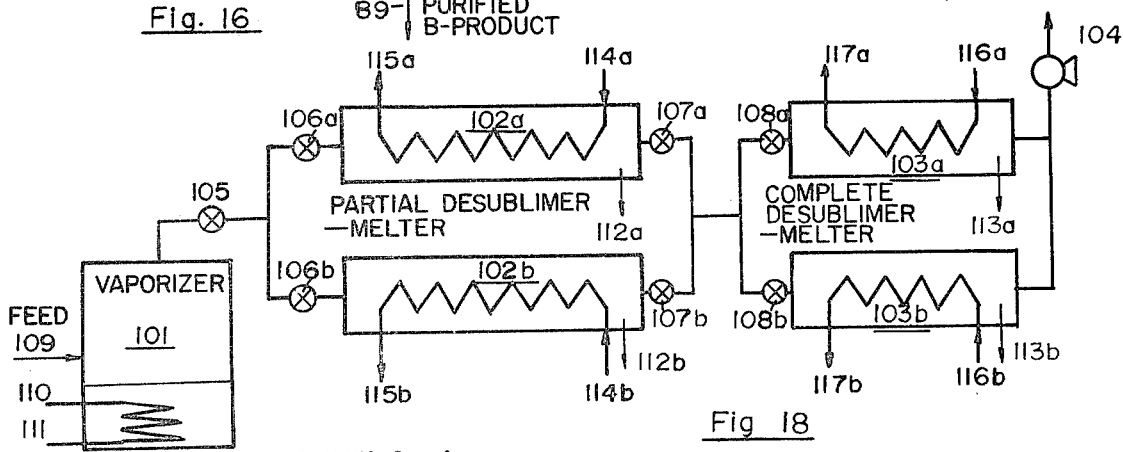
DRAWING 4
Fig. 18

DISTILLATIVE FREEZING PROCESS FOR SEPARATING VOLATILE MIXTURES AND APPARATUSES FOR USE THEREIN

RELATED APPLICATIONS

This application is a continuation-in-part application of (1) Ser. No. 676,640 application filed on Apr. 13, 1976 U.S. Pat. No. 4,028,445, June 7, 1977 and entitled "Simultaneous Flash-Vaporization and Fractional Solidification Process" and (2) Ser. No. 816,852 application filed on July 18, 1977, now abandoned and entitled "Solid-Vapor Region Refining Process."

BACKGROUND OF THE INVENTION

1. Field of Invention

Separation of a mixture containing volatile components is a very important operation in chemical industries. In some cases, the required product purities are very high. Examples are production of polymerization grade monomers, such as ethylene, propylene, styrene, butadiene and p-xylene. Distillation operations have been used in most cases and freezing operations have only been used in some special cases. The distillative freezing process disclosed combines the advantageous features of both the distillation and freezing operations and remove their disadvantages.

2. Brief Description of the Prior Art

When a distillation operation is used in separating a mixture containing components that are very close in boiling points and volatilities, the number or plates required in very large and a large reflux ratio has to be used. Therefore, both the equipment cost and operating cost are very high. Furthermore, these costs increase greatly as the required product purity increases. Separations of ethylene-ethane mixtures, propylene-propane mixtures, styrene-ethylbenzene mixtures and p-xylene-m-xylene mixtures in producing high grade ethylene, propylene, styrene and p-xylene respectively are good examples. There is a great need for finding a better and more economical way of accomplishing the desired separations.

In a conventional fractional solidification process, a feed containing a crystallizing component and one or more impurities is brought into a two phase solid-liquid region to form a mixture containing crystals of the crystallizing component and a liquid mixture containing the impurities. An expensive scraped surface freezer is usually used in this operation. A centrifuge or a hydraulic washing column is then used to free the crystals from the mother liquor. Even though the crystals formed are usually very pure, it has been very difficult to produce a very high purity product of the crystallizing component. The difficulty arises because all the impurities in the feed are present in the liquid phase that surrounds the crystals and a complete separation of the crystals from the surrounding impure liquid phase is difficult. For example, crude p-xylene has been purified by a fractional solidification process. However, it has been difficult to produce p-xylene that is better than 99.9% in purity due to the difficulty described. Equipment cost of a conventional fractional solidification process is usually very high.

It is important to distinguish the distillative freezing process of the present invention from a vacuum freezing desalination process and a vacuum crystallization process. In a vacuum freezing desalination process (also called an evaporative freezing process), only one component (water) vaporizes and the same component (water) freezes. In a vacuum crystallization process, only one component (solvent) evaporates while the other component (solute) crystallizes. In a distillative freezing process two or more components are vaporized from a feed under a sufficiently reduced pressure and only one component freezes. The low pressure vapor formed in a distillative freezing process is a vapor mixture and can be transformed to a condensed mass in a simple way without pressurization.

BRIEF DESCRIPTION OF THE INVENTION

Each of the processes to be described is useful in separating a micture that contains at least two volatile components, denoted as A-component and B-component. It has a first characteristic step of forming a low pressure vapor mixture of the components and a solid phase enriched (in many cases substantially pure) in B-component. The second characteristic step is that the low pressure vapor mixture is brought to a condensed state without being substantially pressurized either by a simple condensation operation or by a mixed condensation-desublimation operation.

In the basic process, heat of crystallization is withdrawn at least partly by concurrently vaporizing portions of the two components from a mixture under a sufficiently reduced pressure that is lower than the triple point pressure of the B-component to form a low pressure vapor mixture and a slurry that comprises a mother liquor and a solid phase enriched with B-component. The B-enriched solid phase is separated from the mother liquor and melted to yield a B-enriched product.

In the first modified process, the concurrent vaporization step described is continued until the mother liquor is substantially completely eliminated so that substantially all of the A-component is transferred to the low pressure vapor phase. In the second modified process, a gas mixture of A and B-components is first formed and the gas mixture is cooled under a sufficiently reduced pressure that is lower than the triple point pressure of B-component to form a B-solid phase while keeping substantially all of the A-component in the remaining vapor phase. In both of these modified processes, the need for separating B-solid from mother liquor has been eliminated. The B-solids obtained in these modified processes can be melted to give very pure B-products. For example, p-xylene of 99.98% purity has been obtained.

The low pressure vapor mixture obtained in each of these processes contains substantial amounts of both components. Therefore, when this vapor is cooled, without being substantially pressurized, the condensed mass obtained is either a condensate (liquid) or a condensate-desublimate (liquid-solid) mixture. When the condensed mass is completely in the liquid state, a continuous process can be used in condensing the low pressure vapor. When the condensed mass is a condensate-desublimate mixture, the desublimate is prevented from adhering on the cold surface in most cases by the presence of the condensate (liquid) and a continuous process can still be used in transforming the vapor to the condensed mass. Even when the desublimate formed does adhere on the cold surface, a simple method to be described can be used in dislodging it from the cold surface.

That both A-component and B-component are vaporized in the first characteristic step leads to the following advantageous features:

(1) The concurrent vaporization of both components enables withdrawal of a large amount of heat and results in formation of a large amount of B-solid.
(2) The vapor formed is a mixture containing substantial amounts of both components and can be transformed into a condensed mass containing a liquid phase.
(3) The mother liquor phase can be completely eliminated by continuing the first characteristic step to yield a uncontaminated B-solid.

BRIEF DESCRIPTION OF THE DRAWINGS

FIG. 1 illustrates a phase diagram of a first binary system containing two volatile components at a pressure higher than the triple point pressures of the components. In this binary system, the volatility ($\alpha_A$) of the first component (A-component) is less than that ($\alpha_B$) of the second component (B-component) and the melting temperature ($T_A$) of the first component is less than ($T_B$) that of the second component.

FIG. 2 illustrates a similar phase diagram for a second binary system in which the volatility ($\alpha_A$) of the first component is higher than that ($\alpha_B$) of the second component.

FIG. 3 illustrates a phase diagram of the first binary system taken at a pressure lower than the triple point pressure of B-component. This figure shows the existence of a three phase state having B-solid, liquid phase and vapor phase and the existence of a two phase B-solid-vapor region.

FIG. 4 illustrates a phase diagram of the first binary system taken at a pressure substantially lower than that of FIG. 3. It shows the existences of two three phase state, one at the A-end (A-L-V) and the other at the B-end (B-L-V) and the existences of two two phase solid-vapor regions, one at the A-end (A+V) and the other at the B-end(B+V).

FIGS. 5 and 6 are similar to FIGS. 3 and 4 and are phase diagrams for the second binary system. These diagrams will be used in illustrating operating conditions for the basic process and the modified processes.

FIGS. 7 through 11 illustrate how phase diagrams of a binary system containing two volatile components vary as the applied pressure is reduced and will be used in explaining the progress of a distillative freezing process.

FIGS. 15 through 17 illustrate equipments that can be used in conducting the first modified process. Each of the equipments illustrated also has two processing zones. In the first zone of each of these units, concurrent vaporizations of the two volatile components can be continued to completely eliminate mother liquor phase.

FIG. 18 illustrates a system in which the second modified process can be conducted. The system includes a unit for vaporizing a binary liquid mixture, units for desubliming some B-components out of the vapor to form residual gas streams and units for transforming residual gas streams into condensed masses.

DESCRIPTION OF PREFERRED EMBODIMENT OF THE INVENTION

Figure 12:
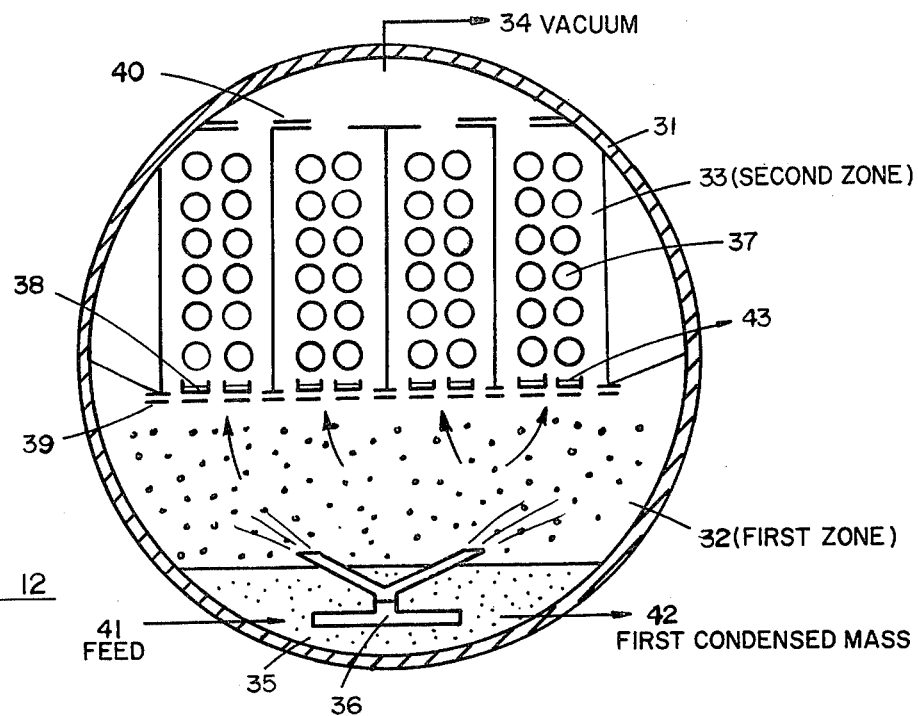
FIGS. 12, 13 and 14 illustrate equipments that can be used in conducting the basic distillative freezing process. Each of the equipments illustrated has a first processing zone in which concurrent vaporizations of the two components and simultaneous crystallization of B-solid take place and a second processing zone in which the low pressure vapor formed in the first zone is transformed into a condensed mass.

1. A brief Review of Phase Diagrams

The processes of the present invention have several basic unit operations. These unit operations can be well explained by referring to some phase diagrams.

The processes of the present invention can be used in separating a mixture containing at least two volatile components, irrespective of whether the two components form an azeotropic mixture or not. For simplicity, however, discussions will be presented by referring to mixtures each having components that do not form an azeotrope. However, the discussions presented can be extended and used for azeotrope forming mixtures.

FIG. 1 illustrates a typical phase diagram of a binary system having two volatile components (A and B) at a pressure $\pi_1$ higher than the triple point pressures of the components. The figure shows a first freezing line 1-3 (saturated with A), a second freezing line 2-3 (saturated with B), an eutectic line 4-3-5, one eutectic point 3, and liquid-vapor lines 6-7. In the system illustrated, the volatility of B (denoted as $\alpha_B$) is higher than the volatility of A (denoted as $\alpha_A$). FIG. 2 illustrates a similar phase diagram for another typical binary system in which the volatility of A is higher than that of B. It is assumed that the volatilities of the two components are reasonably close to each other.

When a mixture of a composition in the range 3-5 is cooled and brought into the region 2-3-5, a part of B-component in the mixture crystallizes out. Therefore, for a mixture in the composition range 3-5, B-component is called the crystallizing component and A-component is called the non-crystallizing component. Conversely, for a mixture of a composition in the range 4-3. A-component and B-component are respectively the crystallizing component and the non-crystallizing component.

A binary mixture treated by the processes of the present invention is called either a Type 1 mixture or a Type 2 mixture according to whether the volatility of the crystallizing component is greater or less than the volatility of the non-crystallizing component. Therefore, mixtures in the range 3-5 of FIG. 1 and mixtures in the range 4-3 of FIG. 2 are Type 1 mixtures; conversely, mixtures in the range 4-3 of FIG. 1 and mixtures in the range 3-5 of FIG. 2 are Type 2 mixtures. In the following sections, a mixture in the range 3-5 of FIG. 1 will be used to represent a Type 1 mixture and a mixture in the range 3-5 of FIG. 2 will be used to represent a Type 2 mixture.

The phase diagram of the system of FIG. 1 taken at a pressure $\pi_2$ that is lower than the triple point pressure of B but higher than that of A is shown as FIG. 3. In the FIG. 3, one can see a B-solid-liquid-vapor-line 9-8-10, denoted as a B-L-V line or a three phase line, and a B-solid-vapor region 8-10-11, denoted as (B+V) region. The presence of the three phase line indicates that the liquid phase 9, the vapor phase 8 and the B-solid phase 10 can reach a three equilibrium state under pressure $\pi_2$ and temperature $T_8$. The pressure and temperature will be respectively referred to as a three phase pressure and a three phase temperature. The presence of the B-solid-vapor region indicates that when a mixture of a composition in the range 8-10 is brought to a state represented by a point in the (B+V) region, it separates into a B-solid mass and a vapor mixture represented by a point on the saturated vapor line 8–11. A liquid phase does not exist in this region. A similar phase diagram of the system of FIG. 2 is shown as FIG. 5. In this figure, one can also see the presence of a three phase line 8–9–10 and a B-solid-Vapor region 8–10–11. By comparing the two three phase lines in these two figures, one notices that, for the Type 1 system, the equilibrium vapor 8 is richer in B than the equilibrium liquid 9 and that for the Type 2 system the reverse is true.

FIG. 4 shows the phase diagram of the system of FIG. 1 taken at a low pressure $\pi_3$ that is lower than the triple point pressure of A-component. In the figure, one can see another three phase line 15-13-14, denoted as an A-L-V line, and another solid-vapor region, denoted as (A+V) region, in addition to those seen on FIG. 3. FIG. 6 shows a similar phase diagram for the system of FIG. 2. Again, one can see an A-L-V line 15-14-13 and an (A+V) region. Descriptions similar to those given for the B-L-V lines and (B+V) regions can be given to these A-L-V lines and (A+V) regions.

2. Key Unit Operations of the Processes and Phase Diagrams

The processes of the present invention are closely related to the presences of the three phase lines and solid-vapor regions in the phase diagrams described. There are several key unit operations in these processes and important information about these unit operations can be obtained by studying these phase diagrams. These unit operations are described in this section.

(1) Three Phase Transformation (denoted as S/L/V operation)

In a basic distillative freezing process, a mixture is transformed into a solid, a mother liquor and a vapor mixture. These coexisting phases can be closely represented by the three phases on a three phase line.

(2) Solid-Vapor Region Transformation (denoted as S/V operation)

In a modified distillative freezing process, a mixture is transformed to a B-solid and a low pressure vapor mixture. Such a state can be represented by a point in the solid-vapor region of a phase diagram. There is no liquid phase under such condition and there is no need to separate solid from mother liquor. Therefore, a modified distillative freezing process will also be referred to as a solid-vapor region refining process.

(3) A Mixed Condensation-Desublimation Operation

As has been described, a solid, a mother liquor and a low pressure vapor mixture are formed from a feed mixture in the basic distillative freezing process. In order to maintain the processing system under the reduced operating pressure, the low pressure vapor has to be transformed into a condensed mass. It is desirable to accomplish this without substantially pressurizing the vapor. Let points 9, 8, 10 in FIG. 3 respectively represent the mother liquor phase, the vapor phase and the solid phase obtained in a three phase transformation of a Type 1 mixture. When the vapor 8 is cooled under the pressure $\pi_2$ to a temperature 16 which is slightly lower than the three phase temperature, it is transformed into a liquid (condensate) 17 and a solid (desublimate) 18. Therefore, this transformation is referred to as a mixed condensation-desublimation operation or, simply, a condensation-desublimation operation.

When a low pressure pure vapor is brought in contact with a cold surface so that the vapor desublimes, the solid formed (desublimate) adhers to the cold surface and interfers heat transfer. Therefore, there is a need to remove the desublimate frequently. It is fortunate that in a process of the present invention, the vapor formed is a mixture of A-component and B-component and a step of transforming the vapor to a condensed mass is either a condensation-desublimation operation or a simple comdensation operation. It is not a simple desublimation operation.

The desublimate formed in a condensation-desublimation operation in a process of the present invention has a much less tendency to adhere on the cold surface. This is because the desublimate/condensate ratio obtained is usually low and the condensate formed tends to wet the cold surface and prevent the desublimate from adhering to the cold surface. Referring to FIG. 3, the desublimate/condensate ratio is given by the ratio of 16-17 to 16-18. When a mixture containing close boiling components is treated by a process of the present invention, the vapor phase 8 and the liquid phase 9 are very close in compositions. Provided that a slight cooling is applied, points 16 and 17 are very close. Therefore, for such a close boiling system, the desublimate/condensate ratio is very small. One may draw the following important conclusion:

"The closer the volatilities of the components in a mixture treated by a distillative freezing process are, the smaller is the desublimate/condensate ratio obtained and the easier it is to carry out the condensation-desublimation operation."

In other words, "The closeness of the volatilities of the components of a mixture makes a distillation process used to separate it difficult; yet, it makes a distillative freezing process used to separate it easier."

When a mixture is subjected to a solid-vapor region refining process (a modified distillative freezing process), the vapor formed can be represented by any point on the saturated vapor line 8–11. However, in order to obtain a high yield of the B-solid, it is desirable that the vapor obtained be represented by a point close to the three phase point 8. Then, the conclusion stated above can also be applied to the solid-vapor region refining process.

(4) A Simple Condensation Operation

Let the vapor, the mother liquor and the solid formed from a Type 2 mixture by a three phase transformation operation be represented by points 8, 9 and 10 in FIG. 5. When the vapor is cooled without being pressurized substantially, it condenses completely to form a condensate at the temperature of point 19. This operation is referred to as a simple condensation of the vapor mixture. That a simple condensation has taken place is due to the fact that the volatility of the non-crystallizing component ($\alpha_A$) is higher than that of the crystallizing component ($\alpha_B$).

It is noted however that when the condensate 19 is cooled down further to 16a, the condensate does separate into a solid and a liquid and the ratio of the two phases is 16a-17a to 16a-18a. Letting, the intersection of line 19-16a and 3-9 be 19a, the range 19-19a is the tolerable degree of undercooling. When the volatilities of the two components are very close, the line segments 8-9, 8-19, and 19-19a are very short. Therefore, when the condenser temperature is not closely controlled, some solid deposition on the condenser wall will take place even though the mixture treated in a Type 2 mixture.

(5) Withdrawal of Heat of Crystallization

The three phase transformation step in a basic distillative freezing step is usually conducted under an adiabatic condition. Therefore, the latent heat released in forming B-solid is mostly removed by vaporizing the A-component and B-component. Therefore, the fact that the non-crystallizing component is also volatile is helpful in the removal of heat of crystallization of B-solid.

3. Basic Distillative Freezing Process

Processing of a Type 1 mixture by the basic distillative freezing process comprises the following five steps:

(1) Step 1: Three Phase Transformation

In this step, a feed mixture is transformed into a low pressure vapor and a slurry that comprises a mother liquor and B-solid.

(2) Step 2: Purification of B-Solid

In this step, the B-solid in the slurry obtained in Step 1 is separated from the mother liquor and purified. The separated mother liquor constitutes a B-lean product.

(3) Step 3: Condensation-Desublimation

In this step, the low pressure vapor mixture obtained in Step 1 cooled without being substantially pressurized and is transformed into a condensate-desublimate mixture.

(4) Step 4: Melting of Purified B-Solid

In this step, the purified B-solid obtained in Step 2 is melted to give a B-enriched product.

(5) Step 5: Melting of Desublimate

In this step, the desublimate obtained in Step 3 is melted. The condensate-desublimate is transformed into a liquid mixture which may also become a B-lean product.

When a type 2 mixture is processed, the processing steps taken are substantially the same as those listed above except that Step 3 becomes a simple condensation operation and Step 5 may be eliminated. Each of the steps listed are explained in detail in this section.

The three phase transformation step may be conducted with heat addition or heat removal. However, it is more convenient to conduct this step under a substantially adiabatic condition so that the heat released in forming B-crystals be removed mainly by vaporizing portions of the A-component and B-component. The operation may be carried out either as a differential process or as an equilibrium process.

An equilibrium batch-wise operation may be described by referring to FIGS. 7 through 11. The figures respectively show phase diagrams of a Type 1 system at successively lower pressures, $\pi_1$ through $\pi_5$. In order to describe the process in a concrete manner, let A and B be m-xylene and p-xylene respectively, and $\pi_1$, $\pi_2$, $\pi_3$, $\pi_4$, and $\pi_5$ be taken roughly as 6 mm Hg, 2.4 mm Hg, 0.8 mm Hg, 0.34 mm Hg, and 0.05 mm Hg. There is no three phase line and no (B+V) region in FIG. 7, since $\pi_1$ is higher than the triple point pressure of B. It is seen in the figures that the three phase line 9-8-10 increases its length and the (B+V) region 8-10-11 expands as the pressure decreases. A series of events that take place are described as follows:

(a) Let it be assumed that the feed is introduced under a condition represented by point 20 in FIG. 7. The feed is then in the liquid state.

(b) Referring to FIG. 8, when the system pressure is reduced to $\pi_2$, the state of the mixture is represented by point 21 which coincides with the equilibrium liquid on the three phase line. A three phase transformation is initiated at this condition. A differential amount of vapor is formed and a differential amount of B-solid is formed.

(c) Referring to FIG. 9, when the system pressure is reduced to $\pi_3$, the state of the mixture is represented by point 22. Substantial amounts of B-solid and vapor have been formed by this time. The ratio of the mass of B-solid ($S_3$) to the mass of vapor ($V_3$) is about equal to the ratio of latent heat of vaporization ($\lambda_V$) to latent heat of crystallization ($\lambda_f$) of B-solid and is represented by 8-23/23-10. One may write $$\frac{S_3}{V_3} \simeq \frac{\lambda_V}{\lambda_f} = \frac{\overline{8-23}}{\overline{23-10}} \tag{1}$$

The mother liquor mass ($L_3$) that remains is related to the sum of solid and vapor masses ($S_3 + V_3$) by $$\frac{L_3}{S_3 + V_3} = \frac{\overline{22-23}}{\overline{9-22}} \tag{2}$$

One may find the masses of B-solid, mother liquor and vapor by using the above relations.

(d) Referring to FIG. 10, when the system pressure is reduced to $\pi_4$, the state of the mixture is represented by point 24. Let point 25 be such that 8-25 to 25-10 ratio is equal to $\lambda_V/\lambda_f$. It is seen that point 24 coincide with point 25 at this pressure. Since the mother liquor mass ($L_4$) is related to the sum of solid and liquid masses ($S_4 + V_4$) by $$\frac{L_4}{S_4 + V_4} = \frac{\overline{24-25}}{\overline{9-25}} \tag{3}$$

and since $\overline{24-25}$ is zero, the mass of mother liquor is zero.

(e) Referring to FIG. 11, when the system pressure is further reduced to $\pi_5$, the state representing the mixture is located at a point 28 within the (B+V) region. The mixture is separated into B-solid and vapor and the ratio of the masses $S_5/V_5$ is given by $\overline{29-28}/\overline{28-30}$. For the feed given, a three phase transformation has to be conducted under a pressure between $\pi_2$ to $\pi_4$ and a solid-vapor region transformation step has to be conducted under a pressure lower than $\pi_4$.

Figure 13:
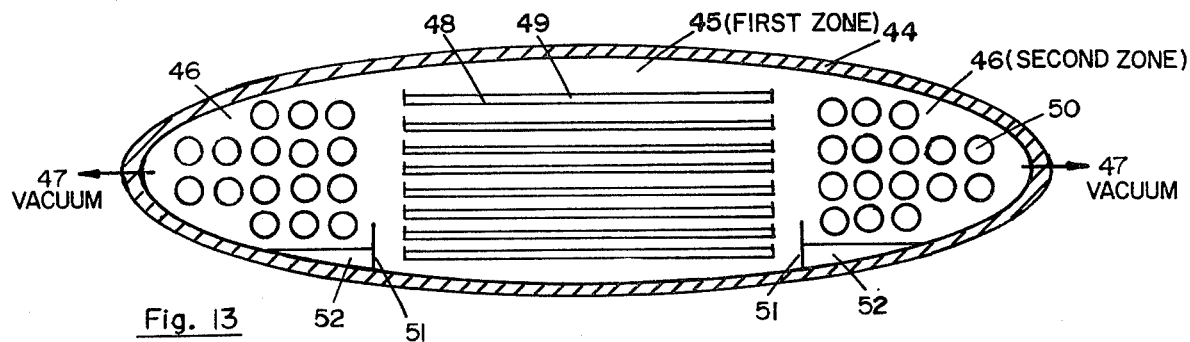
Figure 14:
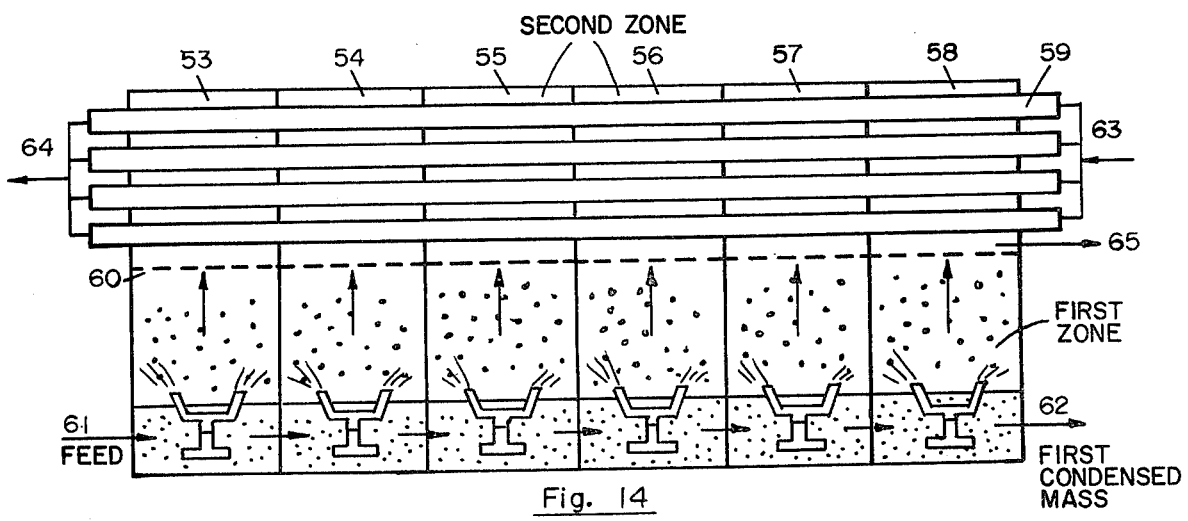

FIGS. 12, 13, and 14 illustrates equipment in which the basic distillative freezing process can be conducted. The processing unit illustrated by FIG. 12 has an insulated enclosure 31 and consists of a first processing zone 32 in which a three phase transformation operation can be conducted and a second processing zone 33 in which a condensation step or a condensation-desublimation can be conducted. The unit is connected to a vacuum pump through a conduit 34. A slurry pool 35 is present in the first zone and a spraying device 36 is used to spray the slurry into space so that the volatile components are vaporized from the droplets to form B-crystals within the droplets. The droplets fall on the pool. The second processing zone may or may not be compartmentized and contains working medium conduits 37. A working medium is contained in the conduits. There are troughs 38 placed under the working medium conduits and valving means 39, 40 are provided for each compartment.

A feed 41 is introduced into the first zone and is transformed into a low pressure vapor stream and a slurry that comprises a mother liquor and B-solid. The slurry stream 42 is removed from the unit and is separated into a mother liquor and a purified B-solid. The mother liquor constitutes a B-lean product. The purified B-solid is melted and becomes a B-enriched product.

The low pressure vapor obtained in the first zone is admitted to the second zone and brought into a heat exchange relation with the working medium (a cooling medium) and is transformed into a condensed mass. The condensed mass may be completely in a liquid state or may be partly liquid and partly solid. In the latter case, the solid may or may not adhere to the conduit walls to interfer heat transfer. When a solid does adhere to the conduit walls, there is a need to remove it from the walls intermittently. It is therefore desirable to prevent an adhering solid phase from forming. However, when an adhering solid phase does form, one has to have a convenient way of removing it.

When a type 1 mixture is processed, the condensed mass is a condensate-desublimate mix and is partly solid and partly liquid. When the conduit walls are properly wetted and the desublimate/condensate ratio is low, the desublimate may not adhere to the walls. Then, it is possible to conduct the condensation-desublimation operation in a continuous manner. In order to prevent desublimate from adhering on the walls, one may recycle some condensate and apply it on the walls. It has been described that when a type 2 mixture is processed and when the cooling operation is properly controlled, the condensed mass is completely in liquid state. In this case, a simple condensation operation has taken place and the operation can be conducted in a continuous manner. Provided that an adhering solid phase does not form, the second processing zone does not have to be compartmentized and the valving means 39, 40 shown are not needed.

However, when an adhering solid phase does form on the walls, it has to be dislodged from the walls at least intermittently. The second processing zone is compartmentized and valving means are provided in each compartment for the purpose of melting at least a part of the adhering solid and dislodging it from the walls. While this operation is in progress in a compartment, the compartment is pressure isolated from the first zone and the vacuum conduit and a heating medium is introduced into the medium conduits. As this process takes place, the pressure in the compartment increases. The pressure increase is accomplished by vaporizing a small amount of the condensed mass in the compartment. That the compartment pressure increases is explained as follows:

There are solid, liquid and vapor existing in the compartment. As the adhering B-solid is melted, the liquid phase becomes richer in B-component. Under the solid-vapor-liquid equilibrium conditions, the system pressure and the liquid composition are related. It can be seen from the way composition of liquid 9 varies in FIGS. 8 through 11, that the system pressure increases as the liquid phase becomes richer in B-component. Therefore, the compartment pressure has to rise as adhering B-solid is melted.

The processing unit illustrated by FIG. 13 can be used when a mixture is processed in such a way that no solid phase adheres to the cold surface. It has an insulated enclosure 44 and has a first processing zone 45 and two second processing zones 46. Conduits 47 are provided at the second processing zone to evacuate the unit. Vaporization trays 48 containing liquid 49 are installed in the first zone and working medium conduits 50 are provided in the second processing zone. Baffles 51 are provided to provide a storage for a condensate or condensate-desublimate. In operation, a feed is added to the trays and the system pressure is reduced. The feed is transformed into a low pressure vapor mixture and a slurry. The slurry is removed from the trays, separated into a purified B-solid and a mother liquor. The melt of the purified B-solid and the mother liquor respectively become a B-enriched product and a B-lean product. The low pressure vapor is either transformed into a condensate or a condensate-desublimate and removed 52 from the system to become a B-lean product.

FIG. 14 illustrates a system in which multistage operation can be conducted. The unit illustrated has six sub-units 53 through 58 each having a first zone and a second zone. Feed 61 is introduced into the first zone of the first unit and transformed into a first vapor and a first slurry. The first slurry is transformed into a second vapor and a second slurry in the second sub-unit, etc. The sixth vapor and the sixth slurry 62 are formed in the sixth sub-unit 58. The sixth slurry is separated into a purified B-solid and mother liquor. A cooling medium 63 is introduced into medium conduits 59 that pass through the second zones of the sub-units and is discharged 64 from the left end. The six vapor streams are transformed into condensates or condensates-desublimates which are discharged at the right end 65.

4. First Solid-Vapor Region Refining Process

The first solid-vapor region refining process is a modified process of basic distillate freezing process. In this process one may feed a liquid mixture $L_1(A+B)$ containing volatile components or a solid-liquid mixture that contains a liquid mixture and some solid of the crystallizing component $S(B)+L_1(A+B)$. It is noted that in processing a feed containing a high concentration of contaminant A, it is advantageous to first apply a fractional solidification process to obtain a mixture enriched with B and subject the B-enriched mixture to the solid vapor region refining process. The feed to be fed to the process is then a mixture of B-solid and liquid $L_1(A+B)$ retained by the B-solid. It has been described that one way to transform a mixture into a B-solid and a vapor is to continue a three phase transformation step until the mother liquor phase is completely eliminated. It has also been described that it is convenient to conduct a three phase transformation operation under an adiabatic condition. It is noted that it is not necessarily preferable to conduct a solid-vapor region transformation under an adiabatic condition.

Processing of a Type 1 mixture or a solid-liquid mixture containing a Type 1 liquid comprises the following four steps:

(1) Step 1: Solid-Vapor Region Transformation
In this step, a feed mixture is transformed into a low pressure vapor and a purified B-solid.
(2) Step 2: Condensation-Desublimation
In this step, the low pressure vapor mixture obtained in Step 1 is cooled without being substantially pressurized and is transformed into a condensate-desublimate. Some of the desublimate formed may adhere to the cold surface.
(3) Step 3: Melting of Purified B-Solid
In this step, the purified B-solid obtained in Step 1 is melted to give a very pure B-product.
(4) Step 4: Melting of Desublimate or Adhering Solid In this step, the desublimate or adhering solid obtained in Step 2 is melted. The condensate-desublimate is transformed into a liquid mixture which constitutes a B-lean product.

When a type 2 mixture is processed, step 2 may become a simple condensation step and step 4 is no longer needed. It is noted that steps 2 and 4 of this process are respectively similar to steps 3 and 5 of the basic distillative freezing processes. Therefore, descriptions of these steps can be omitted, and only a description of Steps 1 and 3 are given in some detail in the following paragraphs.

In a solid-vapor region transformation one may choose both the pressure P and the temperature T. Knowing the feed composition and the feed temperature and after choosing the operating temperature and pressure, one can find the equilibrium yield and heat input needed or heat removal required in the following manner. For example, let the feed be represented by point 20 in FIG. 7 and let the operating pressure be $\pi_5$. Draw a constant temperature line at the operating temperature and let its intersection with the saturated vapor line 8–11 be 29 and its intersection with the B-line be 30. Then draw a constant composition line through point 20 and let its intersections with the three phase line at $\pi_5$ and the constant temperature line 29–30 be point 26 and 28 respectively. Letting the feed be $L_1$, B-solid formed be S, and the vapor formed be $V_2$, one obtains the following relations:

$$\frac{S}{L_1} = \frac{\overline{29-28}}{\overline{29-30}} \quad (4)$$

$$\frac{V_2}{L_1} = \frac{\overline{28-30}}{\overline{29-30}} \quad (5)$$

$$\frac{S}{V_2} = \frac{\overline{29-28}}{\overline{28-30}} \quad (6)$$

The heat input required $Q/L_1$ per unit mass of feed is given by $$\frac{Q}{L_1} = \frac{V_2}{L_1}(H_2 - h_1) - \frac{S}{L_1}(h_1 - h_s) \quad (7)$$

where $H_2$, $h_s$ and $h_1$ are enthalpies per unit mass of the vapor, B-solid and feed respectively. By referring to equation (4) and FIG. 11, it is seen that yield of B-solid increases as the operating temperature is brought closer to the three phase temperature.

Normal procedures to follow in selecting the operating conditions for a solid-vapor region transformation are outlined as follows:
(1) Choose operating pressure from the cooling medium temperature to be used in transforming the low pressure vapor into a condensed mass.
(2) Choose operating temperature as a temperature slightly higher than the three phase temperature at the pressure.
(3) Find the amount of heat to be supplied or removed by using Equation 7.

While melting of purified B-solid takes place, the pressure of the zone has to be raised to a pressure higher than the triple point pressure of B-component. It will be shown that by pressure isolating the zone and by introducing a heating medium, a small amount of B-component vaporizes and accomplishes the desired pressure increase. Melting then takes place in the zone. No compressor is needed in this operation.

FIG. 15 illustrates a unit in which a solid-vapor region process can be conducted. It comprises an insulated enclosure 66, a heat conducting wall 67 enclosing several conduits 68 which contain a heat transfer medium, heat transfer tubes 69 containing a heat transfer medium, sliding valving means 70, and evacuating conduit with a valve 71 connecting the enclosure to a vacuum pump 72. The enclosure is separated by the sliding valve means, into a first processing zone which is below the valve means and a second processing zone which is above the valve means. Step 1 and Step 3 are conducted in the first zone and Step 2 and Step 4 are conducted in the second zone.

The operational procedures are described by referring to processing of a Type 1 binary liquid mixture in which the volatility of the crystallizing component is higher than that of the non-crystallizing component. Feed $L_1(A+B)$ 73 is introduced in the enclosure to form a layer of the mixture 74; a heating medium, a cooling medium or none is passed through the conduits to maintain the mixture at the desired operating condition; a cooling medium is passed through the conduits 69; the vacuum pump is actuated. A low pressure vapor $V_2(A+B)$ is formed, leaves the first zone and enters the second zone and is condensed and desublimed into a mixture $M_2(A+B)$ containing B-solid and a liquid mixture. As the low pressure vapor leaves the mixture in the first zone, B-solid begins to form. In other words, the liquid mixture is transformed into B-solid and the low pressure vapor. The operations in the two zones are continued until the liquid phase in the first zone is substantially completely eliminated. It is seen that, during this period, Step 1 and Step 2 are simultaneously conducted in the two zones. The sliding valve means 70 and the valve provided on the evacuating conduit 71 are than closed so that two zones are isolated from the vacuum line and are isolated from each other. Heating mediums are passed through conduits 68 and 69 to cause melting of the B-solid in the two zones. It is seen that during this period, Step 3 and Step 4 are respectively conducted in the two zones and the pressures in these two zones are raised by vaporizing small amounts of the components in these zones. The pressure in the first zone is higher than the triple point pressure of B-component and the pressure increase is due mainly to vaporization of B-component. The purified B-liquid that is formed in the first zone and the B-lean liquid that is formed in the second zone are removed from the two zones to become two products $L(B)$ and $L_2(A+B)$ respectively. The operations described complete a cycle and next cycle is initiated.

When a mixture processed is a Type 2 mixture in which the volatility of the crystallizing component is less than that of the non-crystallizing component, there may no need for Step 4. Therefore, while Step 3 is conducted in the first zone, the second zone is in an idle condition.

The unit of FIG. 15 may also be used to process a feed that already contains B-solid. One simply introduces a mixture of B-solid and liquid instead of a liquid feed. Other operational steps are the same. One may also introduce a liquid feed $L_0(A+B)$ and transform it into a mixture of B-solid and a liquid mixture, prior to initiating the operating procedures for the solid-vapor region refining process. In carring out this extra step, one closes the sliding valve to isolate the first zone from the second zone, introduces a feed into the first zone, introduces a cooling medium into conduits 68 to remove heat from the mixture and form B-solid therein. The procedures described are then followed.

The unit illustrated by FIG. 16 has an insulated enclosure 77 and is divided into three sub-units 78, 79, 80 by partitions 81, 82. Each sub-unit has a first processing zone 83 at the center and two second processing zones 84 at the two sides. There are several heat conductive plates 85 containing conduits for a working medium. There are heat transfer tubes 86 in the second zones. The two zones are separated by sliding valving means 87. In operation, a feed mixture 88 is introduced to the heat conductive plates 85 and is cooled to the desired temperature. On evacuating the unit, a low pressure vapor is formed from the feed and B-crystals are formed. This operation is continued until the liquid phase is completely eliminated. The low pressure vapor is admitted to the second zone through the sliding valving means 87 and is either condensed or condensed and desublimed. When these operations are completed, these zones are isolated from each other by closing the sliding valving means and are isolated from the vacuum pump. Heating mediums are introduced into the conduits in the first zone and the heat transfer tubes in the second zone to melt the B-solid and desublimate in the two zones respectively. Again, pressures in these two zones are raised during this period and the pressure increases are caused by pressure isolation of the zones and vaporization of one or more components in the zones. The melt of the B-solid 89 and the liquid formed in the second zone 90 respectively become a purified B product and a B-lean product.

FIG. 17 illustrates a unit in which a solid-vapor region transformation operation can be conducted continuously. It is somewhat similar to a rotary disk dryer. It has an insulated enclosure 91 and has a first zone 92 and a second zone 93. These two zones are separated a louvered partition 94. There are rotating disks 95 attached to a rotating shaft 96 in the first zone and there are heat transfer tubes 97 in the second zone. In operation, a feed 98 is added on the first disk and the content on a disk is continually transferred to the next lower disk. As the content moves through the unit downward, a low pressure vapor is formed and the vapor is transformed to a condensed mass in the second zone. Purified B-solid 99 is removed from the unit at the bottom of the unit. The condensed mass 100 obtained in the second zone is removed at the bottom of the unit. When it is desired either to supply heat or remove heat from the content on the trays, one may provide heat transfer conduits at the bottom parts of these trays.

One may also conduct a solid-vapor region transformation in a spraying system. The system comprises a spraying zone which comprises a large empty space and a spraying device and a condensation or condensation-desablimation zone which contain heat transfer tubes containing a cooling medium. In operation, a feed, either a liquid mixture $L_1(A+B)$ or a mixture containing a liquid mixture and some B solid $S(B)+L_1(A+B)$ is sprayed to form small droplets in the spray processing zone, which is maintained at a low pressure by the cooling in the condenser or condenser/desublimer and a vacuum pump. The liquid mixture is converted into a low pressure vapor $V_1(A+B)$ and B-solid, and the B-solid is collected at the bottom of the zone. The B-solid is transfered through a conveyor into a mixer, wherein it is mixed with a recycle B-liquid stream to become a slurry. The slurry is sent to a melter and is converted into pure B-liquid. A part of this liquid is discharged from the unit as a purified B-product and the remainder is recycled to the mixer. The low pressure vapor is converted into a first condensed mass in the condenser or condenser-desublimer. When the first condensed mass contains some B-solid, an additional step is needed to melt the B-solid. This may be done in the way described in connection with the second zone of FIG. 15. It is noted that by the nature of the spray processing operation, the solid-vapor region transformation is conducted in an adiabatic manner.

5. Second Solid-Vapor Region Refining Process

The second solid-vapor region refining process is another modified process of the basic distillative freezing process. Processing of a Type 1 mixture comprises the following five steps:
(1) Step 1: Complete Vaporization Step.
  In this step, a feed is vaporized and a low pressure vapor mixture is obtained.
(2) Step 2: Partial Desublimation
  The low pressure vapor mixture is cooled at a pressure lower than the triple point pressure of B-component to thereby desublime a part of the B-component. As the results of this operation, the vaor is transformed into a purified B-solid and a residual gas mixture.
(3) Step 3: Condensation-Desublimation of the Residual Vapor Mixture
  In this step, the residual vapor mixture obtained in Step 2 is further cooled down and is transformed into a condensate-desublimate mixture.
(4) Step 4: Melting of the Purified B-Solid
  In this step, the purified B-solid obtained in Step 2 is melted to give a very pure B-product.
(5) Step 5: Melting of Desublimate or Adhering Solid
  In this step, the desublimate or adhering solid obtained in Step 3 is melted. The condensate-desublimate is transformed into a liquid mixture which constitutes a B-lean product.

When a type 2 mixture is processed, a simple condensate may be obtained in Step 3, and Step 5 is not needed. However, when an adhering solid is formed in Step 3, Step 5 is needed to dislodge the adhering solid.

Step 2 and 3 above may be explained by referring to FIG. 11. Let the low pressure vapor formed in Step 1 be represented by print 28a. When the vapor is cooled under $\pi_5$ so that its temperature becomes that of point 28, it separates into the residual vapor $(V_5)$ 29 and B-solid $(S_5)$ 30 in the ratio of $\overline{28-30}$ and $\overline{29-28}$. The residual gas is then cooled below the three phase temperature and is transformed into a condensate-desublimate.

FIG. 18 illustrates a system in which the second solid-vapor region refining process can be conducted. The system comprises a vaporizer 101, one or more desublimer-melters 102a, 102b, and one or more condensers or one or more condenser-desublimer-melters 103a, 103b. In the process, a feed 109 is vaporized in the vaporizer 101 by heating medium 110 and 111. The vapor is depressurized through valve 105 and introduced to one or more of the desublimer-melters through one or more of the valves 106a and 106b. Let it be assumed that desublimation is taking place in unit 102a and melting is taking place in unit 102b. Then, valves 106a and 107a are open and valves 106b and 107b are closed, and a cooling medium 114a, 115a and a heating medium 114b, 115b are respectively passed through units 102a and 102b. B-solid is formed on the outer surfaces of the heat transfer tubes in unit 102a and the low pressure vapor becomes lean in B-component. This B-lean vapor $V_2(A+B)$ denoted as a residual vapor is sent to condenser or condenser-desublimer-melter 103a or 103b. Let us assume that the unit 102b has gone through a desublimation operation and has a layer of B-solid on the tube surface. With valves 106b and 107b closed, a heating medium 114b, 115b is passed through the unit to thereby vaporize a small amount of B-component to raise the pressure to a pressure equal to or greater than the triple point pressure of B-component and melt the B-solid. The melt 112b is the refined B-liquid L(B). The two operations are alternatively conducted in units 102a and 102b to send residual vapor mixture to units, 103a and 103b, and produce refined B-liquids 112a and 112b. Each of the units 103a and 103b receives residual gas, transforms it into a condensate-desublimate mix and then melt it in the way the second zone of the system of FIG. 15 operates and discharges a B-lean liquid $L_2(A+B)$. A cooling medium and a heating medium 116a, 117a, 116b, 117b are used in these operations. When the feed is a type 2 mixture, the units 103a and 103b serve as condensers and transform the residual vapor into a B-lean liquid.

6. Category 1 Mixture and Category 2 Mixture.

Referring to FIGS. 3, 4, 5 and 6, a system containing two volatile components, denoted as A-component and B-component, may reach a state of equilibrium consisting of a solid phase, a liquid phase and a vapor phase. The state may be referred to as an A-end three phase state or a B-end three phase state depending on whether the solid phase is an A-solid or a B-solid. The temperature and pressure of an A-end three phase state are denoted as $(T_3)_A$ and $(P_3)_A$ respectively; the temperature and pressure of a B-end three phase State are denoted as $(T_3)_B$ and $(P_3)_B$ respectively. The three phase pressure is a function of the three phase temperature. The system may also reach a state of equilibrium consisting of four phases: A-solid, B-solid, liquid and vapor. The state is referred to as a four phase state and its temperature and pressure are denoted as $T_E$ and $P_E$ respectively. Finally, the triple point pressure and temperature of A-component are denoted as $(P_0)_A$ and $(T_0)_A$ respectively and the triple point pressure and temperature of B-component are denoted as $(P_0)_B$ and $(T_0)_B$ respectively.

Among the temperatures defined above, there exist the following relations:

$$(T_0)_A > (T_3)_A > T_E, \tag{8}$$

and $$(T_0)_B > (T_3)_B > T_E \tag{9}$$

Letting B-component of a mixture be the crystallizing component, the mixture may belong to Category 1 mixture or Category 2 mixture according to which of the following relations holds:

$$\text{Category 1: } (P_0)_B > (P_3)_B > P_E \tag{10}$$

$$\text{Category 2: } (P_0)_B > (P_3)_B > P_E \tag{11}$$

Most mixtures that can be processed economically by a process of the present invention belong to Category 1. Therefore, phase diagrams and operational procedures described so far are for Category 1 mixtures. A Category 2 mixture is one in which volatility of A-component is very much higher than that of B-component and/or the solubility of B-component in saturated liquid varies greatly with temperature. Operational procedures for treating a Category 2 mixture by a process of the present invention are described in the next paragraph.

A three phase transformation operation and a solid-vapor region transformation operation used in processing a Category 2 mixture are substantially the same as those used in processing a Category 1 mixture. However, the steps of transforming the low pressure vapors obtained from Category 1 mixture and a Category 2 mixture are substantially different. When a low pressure vapor obtained in processing a Category 2 mixture is cooled, it is first transformed into a B-solid and a residual vapor. After a substantial lowering in temperature, the vapor is transformed into a mixture of A-solid and B-solid, which adhere on the cold surface. One may dislodge the adhering solid by the pressure isolating the second zone and raising the pressure by vaporizing minor fraction of the condensed mass. One may also apply an absorbing liquid in the second zone to transform the vapor into a condensed state.

7. Concluding Remarks

A process of the present invention has the following characteristic steps:

(1) Transforming a mixture into a low pressure vapor and a solid of the crystallizing component.
(2) Transforming the low pressure vapor into a condensed mass.

The operating pressures and operating temperatures of these steps are generally lower than the triple point pressure and temperature of the crystallizing component. Table 1 lists triple temperatures and pressures of various substances. The values listed are estimated from vapor pressure values listed in "Handbook of Chemistry and Physics", by The Chemical Rubber Company. In the table substances are classified into four classes: Class 1 substances have the triple point pressures greater than 10 mm Hg, Class 2 substances have triple point pressures in the range of 1 mm Hg to 10 mm Hg, Class 3 substances have triple point pressures in the range of 0.01 mm Hg to 1 mm Hg and Class 4 substances have triple point pressures less than 0.01 mm Hg. It is seen that a large volume of vapor has to be handled in these steps and the vapor volume increases as the triple point pressure of B-component decreases.

Table 1

| Classification of Substances According to Triple Point Pressure | | |
|---|---|---|
| Class 1: Triple Point Pressure Greater Than 10 mm Hg | | |
| Substance | Triple Point Temperature (°C.) | Triple Point Pressure (mm Hg) |
| 1. Aluminum Chloride | 192.4 | 1800 |
| 2. Ferric Chloride | 304 | 480 |
| 3. tert-Butyl alcohol | 25.3 | 42.2 |
| 4. Cyclobutane | −50.0 | 39.2 |
| 5. Benzene | 5.5 | 35.85 |
| 6. 1, 2, 4, 5 Tetrachlorobenzene | 139 | 31.1 |
| 7. tert-Butyl chloride | −26.5 | 26.25 |
| 8. 1, 4 Dioxane | 10 | 18.2 |
| 9. Tetrachloroethylene | −35 | 14.34 |
| Class 2: Triple Point Pressure in the Range of 1 mm Hg to 10 mm Hg | | |

Table 1-continued
Classification of Substances According to Triple Point Pressure

| | Substance | Triple Point Temperature (°C.) | Triple Point Pressure (mm Hg) |
|---|---|---|---|
| 1. | Acetic acid | 16.7 | 9.5 |
| 2. | 1, 4 Dichlorobenzene | 53.0 | 9.13 |
| 3. | Phthalic anhydride | 130.8 | 8.3 |
| 4. | Naphthalene | 80.2 | 7.7 |
| 5. | 1, 8.5 2 Etha-nediamine | | 4.3 |
| 6. | p-Xylene | 13.3 | 4.29 |
| 7. | Maleic anhydride | 58.0 | 3.6 |
| 8. | Chloroacetic acid | 61.2 | 3.21 |
| 9. | Acetamide | 81.0 | 2.9 |
| 10. | Succinimide | 125 | 2.3 |
| 11. | Acrylic acid | 14 | 2.2 |
| 12. | Dichloroethane | −35.3 | 2.2 |
| 13. | Diacetamide | 78.5 | 2.1 |
| 14. | Phenol | 40.6 | 1.2 |
| 15. | tert-Amyl alcohol | −11.9 | 1.1 |
| 16. | 1-Naphthol | 96 | 1.1 |

Class 3:
Triple Point Pressure in the Range of 0.01 mm Hg to 1 mm Hg

| | Substance | Triple Point Temperature (°C.) | Triple Point Pressure (mm Hg) |
|---|---|---|---|
| 1. | p-Nitrotoluene | 51.9 | 0.96 |
| 2. | Biphenyl | 69.5 | 0.94 |
| 3. | Ethylene | −169 | 0.88 |
| 4. | Silicon tetrachloride | −68.8 | 0.606 |
| 5. | 2, 4 Dichlorophenol | 45 | 0.59 |
| 6. | 1, 3 Butadiene | −108.9 | 0.49 |
| 7. | Epichlohydrin | −25.6 | 0.48 |
| 8. | Silane ($SiH_4$) | −185.0 | 0.37 |
| 9. | Titanium tetrachloride | −30.0 | 0.28 |
| 10. | Styrene | −30 | 0.16 |
| 11. | o-Xylene | −25.2 | 0.18 |
| 12. | 1-Butene | −130 | 0.035 |
| 13. | m-Xylene | −47.9 | 0.028 |

Class 4:
Triple Point Pressure Less Than 0.01 mm Hg

| | Substance | Triple Point Temperature (°C.) | Triple Point Pressure (mm Hg) |
|---|---|---|---|
| 1. | Ethane | −183.2 | 0.0086 |
| 2. | Trichlorosilane | −126.6 | 0.003 |
| 3. | Ethyl benzene | −94.9 | 0.0001 |
| 4. | Propylene | −185 | $1.26 \times 10^{-45}$ |
| 5. | Propane | −187.1 | $3.49 \times 10^{-6}$ |

It is noted that a large volume of low pressure vapor is formed in the first zone, travels to the second zone, and is transformed into a condensed mass in the second zone. The flow of the low pressure vapor can be handled efficiently in an equipment that has the following features:

(1) A first zone and second zone being placed closely so that the vapor travels only a short distance.
(2) Providing a large cross sectional area per unit mass flow rate.

A processing unit may have many interlaid first zones and second zones. It is noted that equipments illustrated by FIGS. 12 through 17 can meet these requirements and the features described have to be incorporated in the system of FIG. 18. As the operating pressure decreases, the volume rate of flow increases. Therefore, the cross sectional area per unit mass flow has to increase and vapor travel path has to be shortened.

Some important applications of the processes of the present invention are described as follows:

(1) Production of high quality p-xylene from a mixture containing impurities such as m-xylene, o-xylene, and ethyl benzene.
(2) Production of high quality styrene from a mixture containing styrene and ethyl benzene.
(3) Production of high grade ethylene from a mixture containing ethylene and ethane.
(4) Separation of butadiene from butylene and butane.
(5) Purification of silane.
(6) Purification of aluminum chloride.

It is important to note that many chemicals of industrial importance belong to Class 2 and Class 3 in Table 1. Operating pressures for purifying these chemicals are rather low. Therefore, it is important to develope equipments that can handle such low operating pressures.

Finally, it is noted that it is important to incorporate a heat pump in a processing unit in order to remove the heat released in a condensation step or a condensation/-desublimation step and supply the heat needed in melting the B-solid. In this way, refrigeration load can be greatly reduced.

What we claim are:

1. A crystallization separation process for separating a multi-component mixture that is at least partly in a liquid state and includes at least two volatile components, denoted respectively as A-component and B-component, into a B-enriched portion and a B-lean portion through formation of a B-enriched solid mass, wherein the two components form a binary system whose constant pressure phase diagram taken at a three phase (B-enriched solid, liquid and vapor) pressure has a two phase (B-enriched solid and vapor) region covering a substantial concentration range above the three phase (B-enriched solid, liquid and vapor) temperature and a two phase (B-enriched solid and liquid) region below the three phase (B-enriched solid, liquid and vapor) temperature, that comprises a first step of forming a first vapor mixture and a first condensed mass that comprises a mother liquor and a solid phase mass enriched in B-component by concurrently vaporizing the two components from the mixture in a first zone under a first temperature and a first pressure that are respectively lower than the triple point temperature and the triple point pressure of the pure B-component.

2. The process of claim 1 which further comprises a second step of transforming the first vapor mixture by itself into a second condensed mass that contains a significant fraction of liquid mass in a second zone by transferring heat therefrom through a heat conducting wall while maintaining the vapor under a second pressure that is also lower than the triple point pressure of the B-component.

3. The process of claim 2, wherein the second condensed mass includes a solid phase that is relatively enriched with respect to B-component and at least a portion of the second condensed mass is melted by transferring heat to the mass while maintaining the mass under an elevated pressure that is higher than the second pressure of the second step by vaporizing a minor fraction of the second condensed mass and providing pressure isolation of the second zone.

4. A crystallization separation process for separating a multicomponent mixture that is at least partly in a liquid state and includes at least two volatile components, denoted respectively as A-component and B- component, into a B-enriched portion and a B-lean portion through formation of a B-enriched solid mass, wherein the two components form a binary system whose constant pressure phase diagram taken at a three phase (B-enriched solid, liquid and vapor) pressure has a two phase (B-enriched solid and vapor) region covering a substantial concentration range above the three phase (B-enriched solid, liquid and vapor) temperature and a two phase (B-enriched solid and liquid) region below the three phase (B-enriched solid, liquid and vapor) temperature, that comprises a first step of forming a first vapor mixture and a first condensed mass that comprises a mother liquor and a solid phase mass enriched in B-component by concurrently vaporizing the two components from the mixture in a first zone under a first temperature and a first pressure that are respectively lower than the triple point temperature and the triple point pressure of the pure B-component and a second step of transforming the first vapor mixture by itself into a second condensed mass that contains a significant fraction of liquid mass in a second zone by transferring heat therefrom through a heat conducting wall while maintaining the vapor under a second pressure that is also lower than the triple point pressure of the B-component, wherein A-component has a greater volatility than the B-component, whereby the second condensed mass constitutes substantially a liquid output that is relatively enriched with the A-component.

5. A crystallization separation process for separating a multicomponent mixture that is at least partly in a liquid state and includes at least two volatile components, denoted respectively as A-component and B-component, into a B-enriched portion and a B-lean portion through formation of a B-enriched solid mass, wherein the two components form a binary system whose constant pressure phase diagram taken at a three phase (B-enriched solid, liquid and vapor) pressure has a two phase (B-enriched solid and vapor) region covering a substantial concentration range above the three phase (B-enriched solid, liquid and vapor) temperature and a two phase (B-enriched solid and liquid) region below the three phase (B-enriched solid, liquid and vapor) temperature, that comprises a first step of forming a first vapor mixture and a first condensed mass that comprises a mother liquor and a solid phase mass enriched in B-component by concurrently vaporizing the two components from the mixture in a first zone under a first temperature and a first pressure that are respectively lower than the triple point temperature and the triple point pressure of the pure B-component and a second step of transforming the first vapor mixture by itself into a second condensed mass that contains a significant fraction of liquid mass in a second zone by transferring heat therefrom through a heat conducting wall while maintaining the vapor under a second pressure that is also lower than the triple point pressure of the B-component, wherein the B-component is chosen from the following substances:

Aluminum Chloride, Ferric Chloride, tert-Butyl alcohol, Cyclobutane, Benzene, 1, 2, 4, 5 Tetrachlorobenzene, tert-Butyl chloride, 1, 4 Dioxane, Tetrachloroethylene, Acetic acid, 1, 4 Dichlorobenzene, Phthalic anhydride, Naphthalene, 1, 2 Ethanediamine, p-Xylene, Maleic anhydride, Chloroacetic acid, Acetamide, Succinimide, Acrylic acid, Dichloroethane, Diacetamide, Phenol, tert-Amyl alcohol, 1-Naphthol, p-Nitrotoluene, Biphenyl, Ethylene, Silicon tetrachloride, 2, 4 Dichlorophenol, 1, 3 Butadiene, Epichlorohydrin, Silane ($SiH_4$), Titanium tetrachloride, Styrene, o-Xylene, 1-Butene, m-Xylene, Ethane, Trichlorosilane, Ethyl benzene.

6. A crystallization separation process for separating a multicomponent mixture that is at least partly in a liquid state and includes at least two volatile components, denotes respectively as A-component and B-component, into a B-enriched portion and a B-lean portion through formation of a B-enriched solid mass, wherein the two components form a binary system whose constant pressure phase diagram taken at a three phase (B-enriched solid, liquid and vapor) pressure has a two phase (B-enriched solid and vapor) region covering a substantial concentration range above the three phase (B-enriched solid, liquid and vapor) temperature and a two phase (B-enriched solid and liquid) region below the three phase (B-enriched solid, liquid and vapor) temperature, that comprises a first step of forming a first vapor mixture and a first condensed mass that comprises a mother liquor and a solid phase mass enriched in B-component by concurrently vaporizing the two components from the mixture in a first zone under a first temperature and a first pressure that are respectively lower than the triple point temperature and the triple point pressure of the pure B-component, wherein the said first step is continued until the mother liquor phase is reduced to a small amount to thereby transfer substantially all of the A-component in the original mixture to the first vapor mixture and thereby form a purified B-solid.

7. The process of claim 6, that further comprises a third step of melting the purified B-solid in the first zone by pressure isolating the zone and supplying heat thereto to thereby transform a minor amount of the B-solid into vapor and raise the zone pressure to a pressure that is higher than the triple point pressure of the B-component, the melt of the B-solid constituting a purified B-product.

8. The process of claim 6 which further comprises a second step of transforming the first vapor mixture by itself into a second condensed mass that contains a significant fraction of liquid mass in a second zone by transferring heat therefrom through a heat conducting wall, while maintaining the vapor under a second pressure that is also lower than the triple point pressure of the B-component.

9. The process of claim 8, that further comprises a third step of melting the purified B-solid in the first zone by pressure isolating the zone and supplying heat thereto to thereby transform a minor amount of the B-solid into vapor and raise the zone pressure to a pressure that is higher than the triple point pressure of the B-component, the melt of the B-solid constituting a purified B-product.

10. The process of claim 8, wherein A-component has a greater volatility than the B-component, whereby the second condensed mass constitutes substantially a liquid output that is relatively enriched with the A-component.

11. The process of claim 10, that further comprises a third step of melting the purified B-solid in the first zone by pressure isolating the zone and supplying heat thereto to thereby transform a minor amount of the B-solid into vapor and raise the zone pressure to a pressure that is higher than the triple point pressure of the B-component, the melt of the B-colid constituting a purified B-product.

12. A process of claim 8, wherein the second condensed mass includes a solid phase that is relatively enriched with respect to B-component and at least a portion of the second condensed mass is melted by transferring heat to the mass while maintaining the mass under an elevated pressure that is higher than the second pressure of the second step by vaporizing a minor fraction of the second condensed mass and providing pressure isolation of the second zone.

13. The process of claim 12, that further comprises a third step of melting the purified B-solid in the first zone by pressure isolating the zone and supplying heat thereto to thereby transform a minor amount of the B-solid into vapor and raise the zone pressure to a pressure that is higher than the triple point pressure of the B-component, the melt of the B-solid constituting a purified B-product.

14. The process of claim 8, wherein the B-component is chosen from the following substances:

Aluminum Chloride, Ferric Chloride, tert-Butyl alcohol, Cyclobutane, Benzene, 1, 2, 4, 5 Tetrachlorobenzene, tert-Butyl chloride, 1, 4 Dioxane, Tetrachloroethylene, Acetic acid, 1, 4 Dichlorobenzene, Phthalic anhydride, Naphthalene, 1, 2 Ethanediamine, p-Xylene, Maleic anhydride, Chloroacetic acid, Acetamide, Succinimide, Acrylic acid, Dichloroethane, Diacetamide, Phenol, tert-Amyl alcohol, 1-Naphthol, p-Nitrotoluene, Biphenyl, Ethylene, Sillicon tetrachloride, 2, 4 Dichlorophenol, 1, 3 Butadiene, Epichlorohydrin, Silane (SiH$_4$), Titanium tetrachloride, Styrene, o-Xylene, 1-Butene, m-Xylene, Ethane, Trichlorosilane, Ethyl benzene.

15. The process of claim 14, that further comprises a third step of melting the purified B-solid in the first zone by pressure isolating the zone and supplying heat thereto to thereby transform a minor amount of the B-solid into vapor and raise the zone pressure to a pressure that is higher than the triple point pressure of the B-component, the melt of the B-solid constituting a purified B-product.

* * * * *